United States Patent [19]
Kanno

[11] Patent Number: 5,894,372
[45] Date of Patent: Apr. 13, 1999

[54] LENS BARREL

[75] Inventor: Hideo Kanno, Chiba, Japan

[73] Assignee: Nikon Corporation, Tokyo, Japan

[21] Appl. No.: 08/953,855

[22] Filed: Oct. 15, 1997

[30] Foreign Application Priority Data

Oct. 15, 1996 [JP] Japan .................. 8-272074

[51] Int. Cl.$^6$ ............................ G02B 7/02
[52] U.S. Cl. .............. 359/823; 359/700; 359/694
[58] Field of Search ........................ 359/823, 694, 359/699, 700, 701, 698

[56] References Cited

U.S. PATENT DOCUMENTS

| | | | |
|---|---|---|---|
| 5,191,482 | 3/1993 | Sekiguchi | 359/823 |
| 5,526,188 | 6/1996 | Kanno et al. | 359/700 |
| 5,530,596 | 6/1996 | Fukino et al. | 359/694 |
| 5,663,839 | 9/1997 | Kanno | 359/700 |
| 5,663,842 | 9/1997 | Takayama et al. | 359/823 |

*Primary Examiner*—Loha Ben
*Attorney, Agent, or Firm*—Morgan, Lewis & Bockius LLP

[57] ABSTRACT

A lens barrel includes a movable frame for holding an optical system, a fixed drum for supporting the movable frame so as to be movable in the direction of an optical axis, and a cam drum for moving the movable frame, wherein the movable frame is movably disposed between the fixed drum and the cam drum, and an outer peripheral portion of the fixed drum is provided with a support portion, penetrating through the movable frame, for rotatably supporting the cam drum.

11 Claims, 4 Drawing Sheets

LENS BARREL

This application claims the benefit of Japanese Application No.8-272074 which is hereby incorporated by reference.

BACKGROUND OF THE INVENTION

1. Field of the Invention

The present invention relates to a lens barrel having a structure for moving a lens unit with a predetermined quantity by use of a cam ring when in focusing and in zooming as well.

2. Related Background Arts

A conventional lens barrel includes a movable frame holding a focusing lens unit and moving an optical-axis direction, a fixed drum for supporting this movable frame so as to be movable in the direction of the optical axis, and a cam ring for giving a driving force for moving the movable frame. According to this type of lens barrel, when in such an optical system that a moving quantity of the focusing lens unit which quantity is needed for focusing up to a closest focusing distance is comparatively small, the cam ring can be fitted to the fixed drum while securing a sufficient length in the direction of the optical axis and can be therefore held on the fixed drum with a stability.

According to a lens barrel having a large maximum photographing magnification and therefore capable of executing, e.g., a close-up photography, however, when in such an optical system that the moving quantity of the focusing lens unit which is required for focusing up to the closest focusing distance is large, the movable frame for holding the focusing lens unit and the cam ring for moving the focusing lens unit, become elongate in the direction of the optical axis. Therefore, in the same positional relationship, the movable frame requires a space having a considerable length in the direction of the optical axis, and the cam ring can not be fitted to the fixed drum while securing the sufficient length in the direction of the optical axis, resulting in such a problem that the cam ring is stably held on the fixed drum with a difficulty.

SUMMARY OF THE INVENTION

It is a primary object of the present invention to provide a lens barrel capable of stably surely holding a cam ring on a fixed drum.

To accomplish the above object, according to one aspect of the present invention, a lens barrel comprises a movable frame for holding an optical system, a fixed drum for supporting the movable frame so as to be movable in a direction of the optical axis, and a cam drum for moving the movable frame. The movable frame is movably disposed between the fixed drum and the cam drum, and an outer peripheral portion of the fixed drum is provided with a support portion, penetrating through the movable frame, for rotatably supporting the cam drum.

Further objects and features of the present invention will become apparent during the detailed description in conjunction with the accompanying drawings.

DESCRIPTION OF THE PREFERRED EMBODIMENTS

First Embodiment

A first embodiment of the present invention will hereinafter be described in greater detail with reference to the accompanying drawings.

Figure 1:
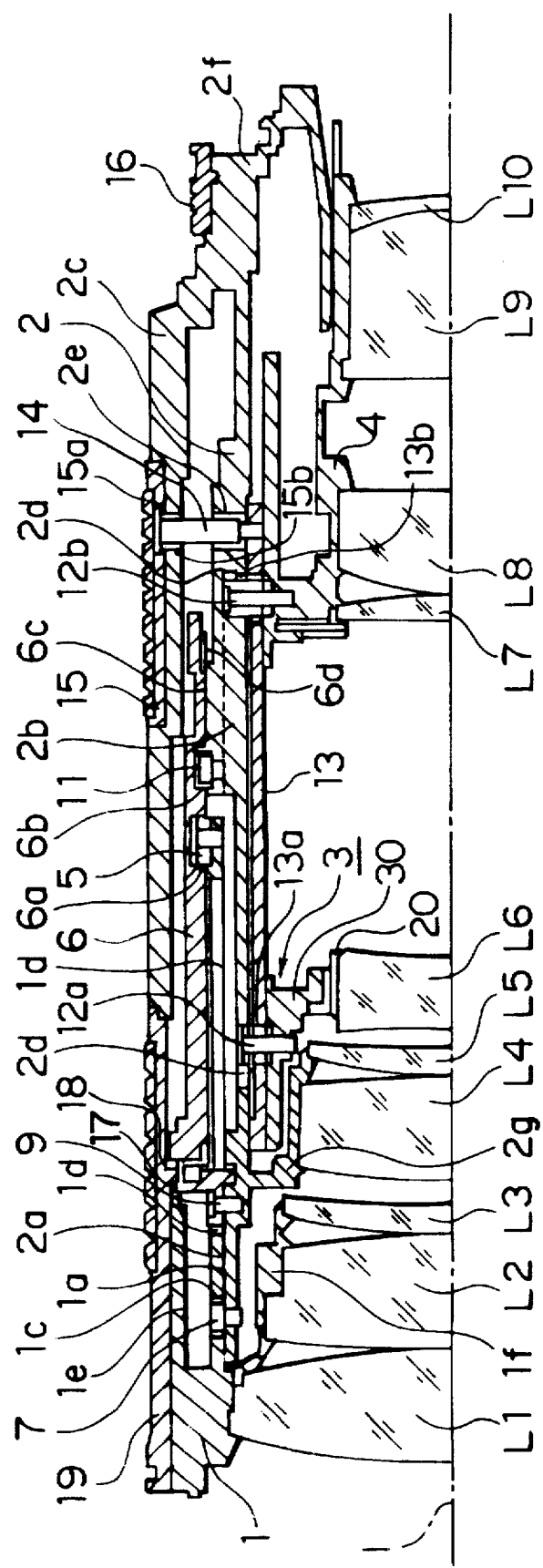
FIG. 1 is an explanatory view showing a lens barrel in section in an embodiment of the present invention.

FIG. 1 is an explanatory view illustrating a lens barrel in section in the first embodiment of the present invention.

A fixed drum 2 is a member constructed of an intermediate-diameter portion 2b, a front end portion 2a protruding from the intermediate-diameter portion 2b in a left direction in FIG. 1, and a large-diameter portion 2c formed outwardly of the intermediate-diameter portion 2b and connected in the right direction of the intermediate-diameter portion 2b in FIG. 1. A mount portion 2f for detachably mounting the lens barrel to an unillustrated camera body, is provided on an outer peripheral portion of the fixed drum 2.

The intermediate-diameter portion 2b is formed with a peripheral groove 2e, having a predetermined length in a circumferential direction, through which a zoom pin 14 movably penetrates. An outer peripheral portion of the intermediate-diameter portion 2b is provided with a peripheral groove pin 11 protruded therefrom, and an intermediate-diameter portion 1a of a first lens group moving frame 1 and a cam ring 6 rotatable about an optical axis I which ring will be mentioned later on, are supported thereon. An outer peripheral portion of a zoom cam ring 13 that will hereinbelow be explained is so fitted in an inner peripheral portion of the intermediate-diameter portion 2b as to be rotatable through a predetermined angle, and a guide grove 2d, into which tips of zoom pins 12a, 12b are movably fitted, is formed in a direction substantially parallel to the optical axis I.

A rectilinear advance pin 7 and a fixing member 17 which will be mentioned later on, are so provided on an outer peripheral portion of the front end portion 2a as to protrude therefrom, and an inner peripheral portion of the front end portion 2a is formed with a fixing frame 2g, protruding from an inner peripheral surface, for holding fixed lens units L4, L5.

The large-diameter portion 2c is formed with a peripheral groove 15b, formed to a predetermined length in its circumferential direction, through which the zoom pin 14 movably penetrates. A focus ring 19, a zoom ring and a known diaphragm ring 16 are rotatably fitted to the outer peripheral portion of the large-diameter portion 2c.

The zoom ring 15 is a member manipulated when photographing while consecutively changing a focal length. An inner peripheral portion of the zoom ring 15 is formed with a hole 15a to which the tip of the zoom pin 14 that will be hereinafter mentioned is fitted and secured.

The first lens group moving frame 1 is a movable frame, movable in the direction of the optical axis I, for supporting focusing lens units L1, L2, L3 constituting the first lens unit. The first lens group moving frame 1 is constructed of an intermediate-diameter portion 1a extending along the optical axis I in the right direction in FIG. 1 and movable between the intermediate-diameter portion 2b of the fixed drum 2 and the cam ring 6, a large-diameter portion 1e provided outwardly of the intermediate-diameter portion 1a and so disposed as to be overlapped with an inner peripheral portion of a focusing ring 19 which will be mentioned later on, and a support frame 1f, provided inwardly of the intermediate-diameter portion 1a, for supporting the focusing lens units L1, L2, L3 at the inner peripheral portion.

The intermediate-diameter portion 1a is formed with a rectilinear advance guide groove 1c, formed in the direction substantially parallel to the optical axis I, into which the rectilinear advance pin 7 fixed to the front end portion of the fixed drum 2 is movably fitted, for regulating a rotation of the first lens group moving frame 1 about the optical axis I and guiding this rectilinear advance pin 7. The inter-mediate portion 1a is also formed with a clearance groove 1d, formed in the direction substantially parallel to the optical axis I, into which the fixing member 17 that will be mentioned later on movably penetrates. The outer peripheral portion of the intermediate-diameter portion 1a is provided with a focus pin 5 protruded at a right end portion direction in FIG. 1. An outer peripheral portion of the front end portion 2a of the fixed drum 2 is so fitted to the inner peripheral portion of the intermediate-diameter portion 1a as to be movable in the direction of the optical axis I. The rectilinear advance guide groove 1c and the clearance groove 1d are, though provided in different angular positions as shown in FIG. 2, shown in the same section in FIG. 1 in order to indicate an axial positional relationship between the two grooves, and the groove 1c is depicted shorter than a real dimension thereof.

The cam ring 6 is a member for giving a driving force for moving the first lens group moving frame 1 in the direction of the optical axis I. An inner peripheral portion of the cam ring 6 is formed with a cam groove 6a into which the focus pin 5 is movably fitted, a circumferential groove 6b, into which a peripheral groove pin 11 is movably fitted, for hindering a movement of this cam ring 6 in the direction of the optical axis I and for permitting only the rotation about the optical axis I, and a segment gear 6d meshing, when the cam ring 6 is rotated by an unillustrated motor through a gear, with this gear. Further, the outer peripheral portion of the first lens group moving frame 1 is so fitted to the inner peripheral portion of the cam ring 6 as to be movable in the direction of the optical axis I. An end portion (which is hereinafter called a first holding portion), formed with the circumferential groove 6b, of the cam ring 6 is rotatably supported on the intermediate-diameter portion of the fixed drum 2 by fitting the outer peripheral portion of the intermediate-diameter portion 2b of the fixed drum 2 to an inner peripheral surface 6c of the cam ring 6. A front end portion (which is hereinafter termed a second holding portion) of the cam ring 6 is rotatably supported on the fixing members 17 via a holding ring 18 that will hereinafter be described.

The focusing ring 19 is a member manipulated when adjusting a focus for forming an image of an object on an unillustrated image forming plane, and rotated about the optical axis I together with the cam ring 6. The focus ring 19 is connected by an unillustrated fixing member so as to rotate about the optical axis I together with the cam ring 6. Further, one end of the focus ring 19 is rotatably supported on the large-diameter portion 2c of the fixed drum 2, and a substantially central portion of the focus ring 19 is rotatably supported on the fixing members 17 through the holding ring 18 which will be mentioned later on.

Figure 2:
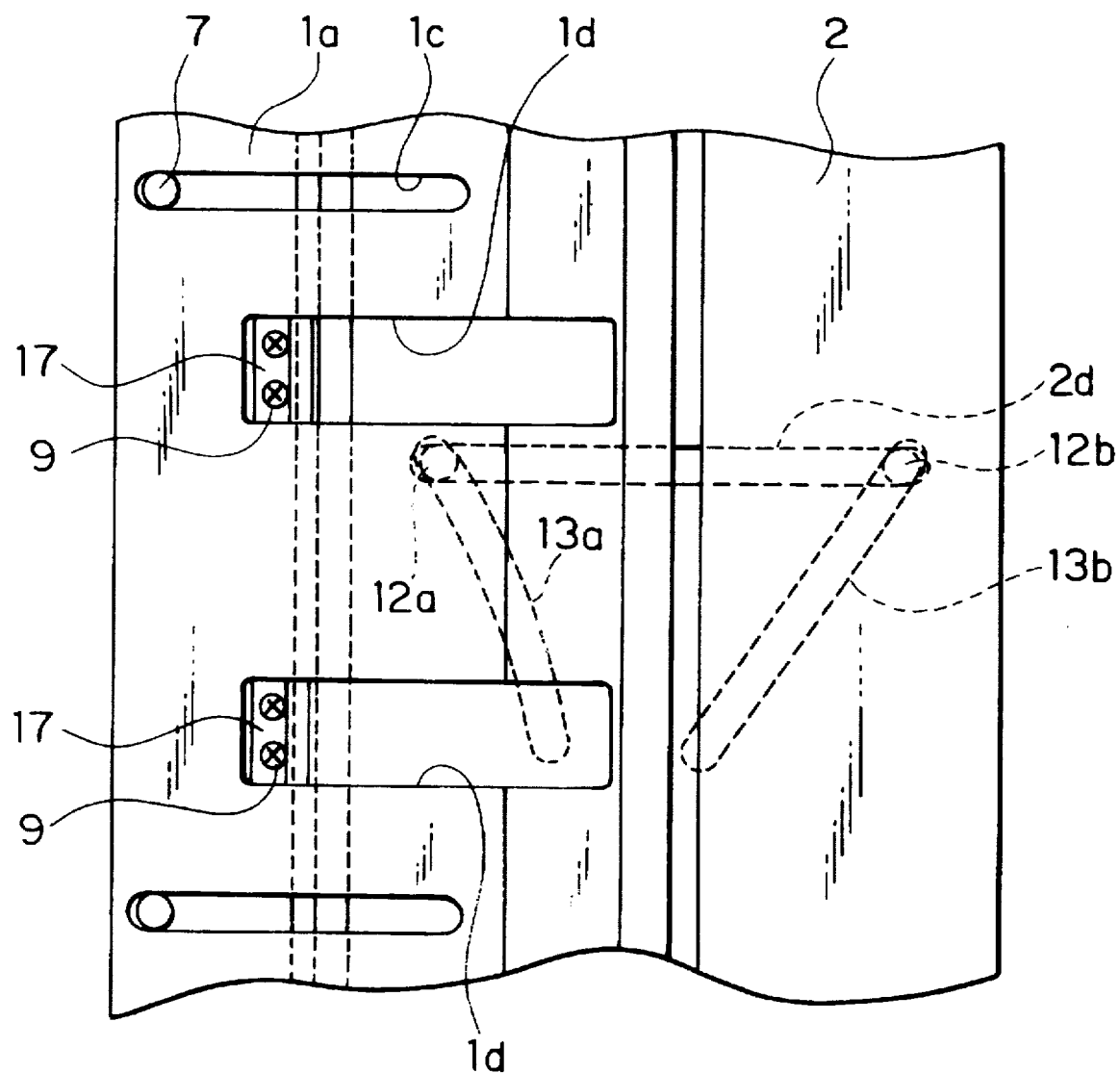
FIG. 2 is a view showing a part of the lens barrel in development in the embodiment of the present invention.

FIG. 2 is a view showing a part of the lens barrel in development in the embodiment of the present invention.

Figure 3:
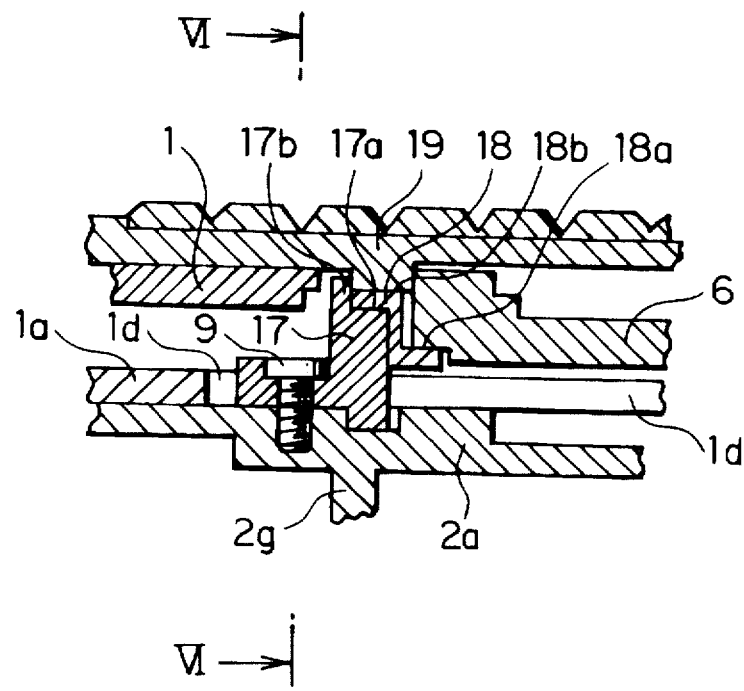
FIG. 3 is a sectional view showing a part of the lens barrel in enlargement in the embodiment of the present invention.
Figure 4:
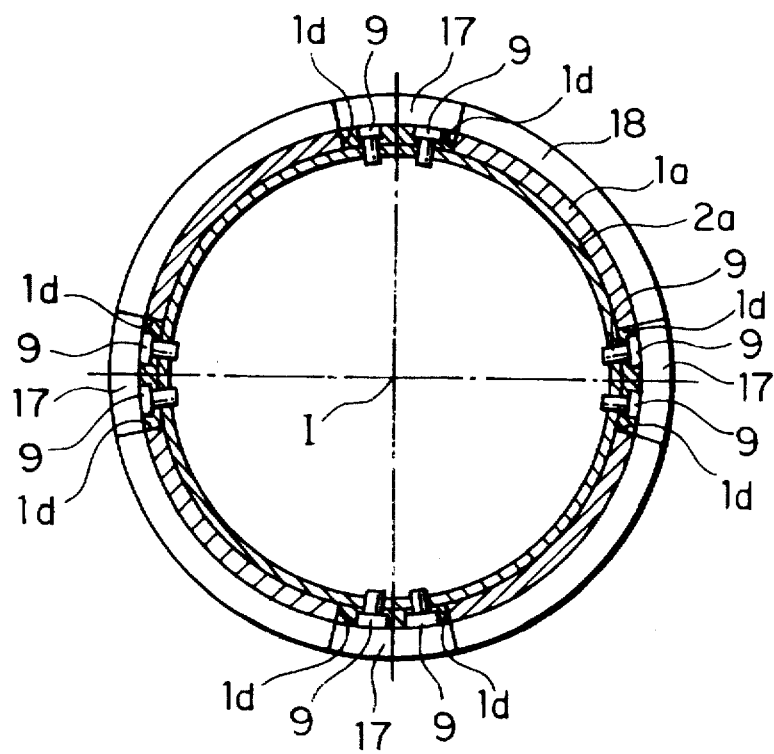
FIG. 4 is a sectional view showing a state of being cut by the line VI—VI in FIG. 3.

FIG. 3 is a sectional view illustrating a part of the lens barrel in enlargement in the embodiment of the present invention. FIG. 4 is a sectional view showing a state of being cut by the line VI—VI in FIG. 3.

The fixing member 17 is a member for rotatably supporting the front end portion of the cam ring 6 and the substantially central portion of the focus ring 19, and for regulating these members from being inclined to the optical axis I. The outer peripheral portion of the fixing member 17 is, as illustrated in FIG. 3, formed with a support portion 17a for supporting an inner peripheral portion of the holding ring 18 which will hereinafter be described, and a protruded portion 17b for regulating a movement of the focusing ring 19 in the direction of the optical axis I. Totally four pieces of the fixing members 17 are fastened to the outer peripheral portion of the front end portion 2a with machine screws 9 at intervals of nearly 90 degrees in the circumferential direction of the front end portion 2a of the fixed drum 2. The fixing members 17 penetrate through four pieces of the clearance grooves 1d formed in the first lens group moving frame 1, corresponding to these fixing members 17, and protrude in the direction substantially orthogonal to the optical axis I.

The holding ring 18 is a member for enabling the cam ring 6 and the focus ring 19 to smoothly rotate. The holding ring 18 is, as illustrated in FIG. 3, a ring-like member in a key-like shape in section, which includes small-diameter portion 18a and a large-diameter portion 18b. The inner peripheral portion of the cam ring 6 is rotatably supported on an outer peripheral portion of the small-diameter portion 18a of the holding ring 18, and the outer peripheral portion of this small-diameter portion 18a serves as a second holding portion of the cam ring 6. The inner peripheral portion of the focus ring 19 is rotatably supported on an outer peripheral portion of the large-diameter portion 18b of the holding ring 18. An inner peripheral portion of the holding ring 18 is supported and fixed in totally four positions by the support portions 17a of the fixing members 17.

Figure 5:
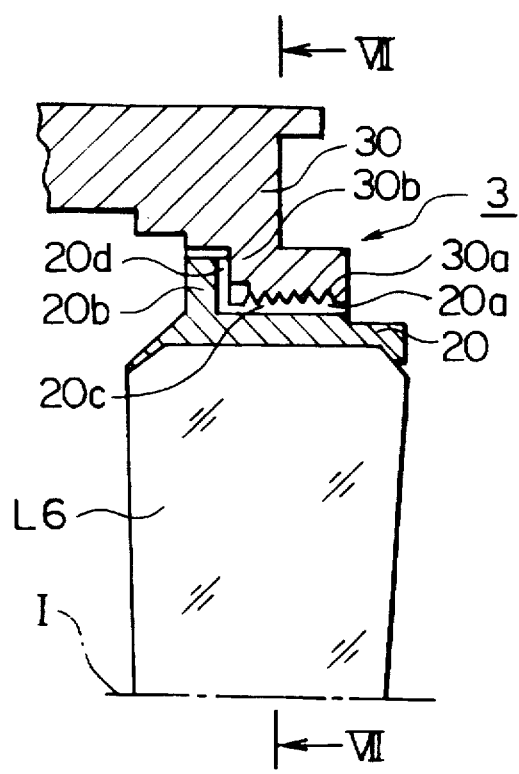
FIG. 5 is a sectional view showing a part of a third lens group moving frame of the lens barrel in enlargement in the embodiment of the present invention.
Figure 6:
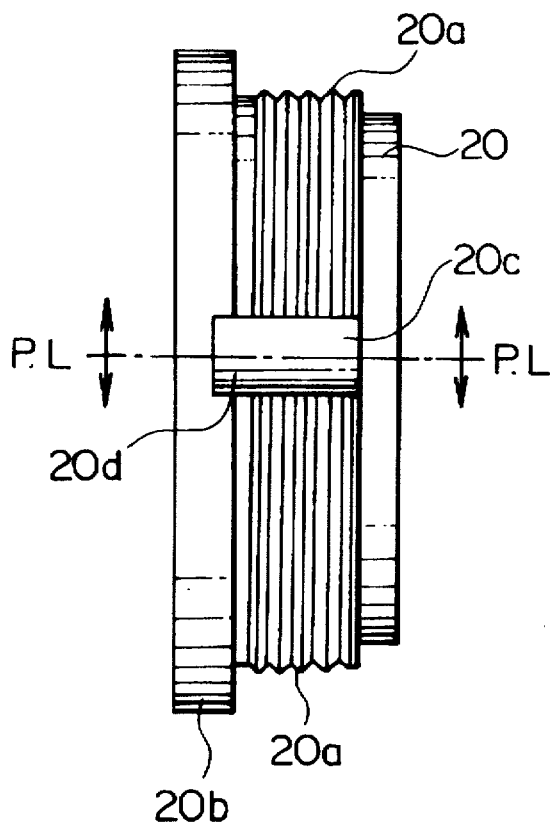
FIG. 6 is a plan view showing a part of a lens fitting member of the lens barrel in enlargement in the embodiment of the present invention.
Figure 7:
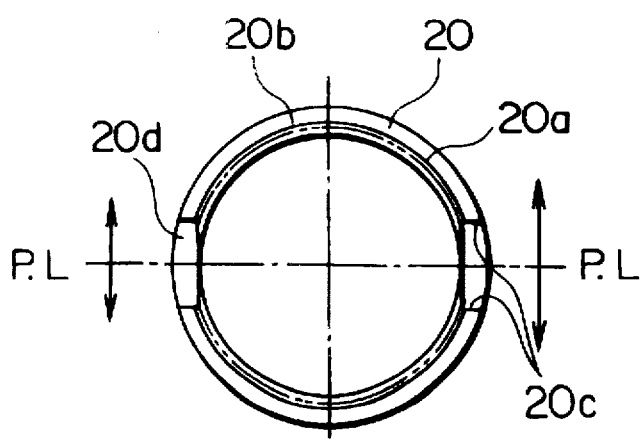
FIG. 7 is a sectional view showing a state of being cut by the line VII—VII in FIG. 5.

FIG. 5 is a sectional view showing a part of a third lens group moving frame of the lens barrel in enlargement in the embodiment of the present invention. FIG. 6 is a plan view showing a part of a lens mounting member of the lens barrel in enlargement in the embodiment of the present invention. FIG. 7 is a sectional view showing a state of being cut by the line VII—VII in FIG. 5.

The third lens group moving frame 3 is, as illustrated in FIG. 5, a movable frame, movable in the direction of the optical axis I, for supporting a third lens unit L6.

The third lens group moving frame 3 is constructed of a frame member 30 and a lens mounting member 20 formed of, e.g., a synthetic resin. The frame member 30 and the lens mounting member 20 are connected to each other via a male screw portion 20c and a female screw portion 30a which will be described later on, in which state a slight gap is, as shown in FIG. 5, formed between an end portion of a radial surface portion 20b and the frame member 30.

The outer peripheral portion of the frame member 30 is provided with a zoom pin 12a penetrating through the cam groove 13a of the zoom cam ring 13 that will hereinafter be mentioned, and a tip of the zoom pin 12a is fitted into the guide groove 2d of the intermediate-diameter portion 2b of the fixed drum 2. The inner peripheral portion of the frame member 30 is, as shown in FIGS. 5 and 6, formed with a radial surface 30b brought into contact with the radial surface portion 20b of the lens mounting member 20, and with a female screw portion 30a, engaging with the male screw portion 20a of the lens mounting member 20, for attaching this lens mounting member 20 to the frame member 30. The third lens group L6 is secured to the inner peripheral portion of the lens mounting member 20. The outer peripheral portion of the lens mounting member 20 is formed with the male screw portion 20a, the radial surface portion 20b, an air flow path 20c, and an air flow groove 20d communicating with this air flow path 20c.

The air flow path 20c is a path through which to flow, when the third lens group moving frame moves in the direction of the optical axis I, the air on the front side in the moving direction of the third lens group moving frame 3 and the air on the rear side in the moving direction of the third lens group moving frame 3. This air flow path 20c makes the use of a parting line portion defined as a clearance groove of a die matching portion when the male screw portion 20a of the lens mounting member 20 is formed by a split mould. In the embodiment of the present invention, as shown in FIG. 7, two lines of the air flow paths 20c are formed in symmetry with respect to the optical axis I in the outer peripheral portion of the lens mounting member 20.

The radial surface portion 20b is a wall-like portion for intercepting light beams incident upon the third lens group L6 from passing through the air flow path 20c. The radial surface portion 20b is, as illustrated in FIGS. 5 to 7, so formed as to protrude in the direction substantially orthogonal to the optical axis I in the circumferential direction from the outer peripheral portion of the lens mounting member 20. The radial surface portion 20b is formed, in its surface opposite to the light beam incident surface, with an air flow groove 20d extending in the direction substantially orthogonal to the optical axis I so as to communicate with the air flow path 20c.

A fourth lens group moving frame 4 is a movable frame, movable in the direction of the optical axis I, for supporting fourth lens groups L7, L8, L9, L10. The fourth lens groups L7, L8, L9, L10 are secured to an inner peripheral portion of the fourth lens group moving frame 4. An outer peripheral portion of the fourth lens group moving frame 4 is provided with the zoom pin 12b protruded therefrom, the tip of which is fitted into the guide groove 2d of the intermediate-diameter portion 2b of the fixed drum 2, wherein the zoom pin 12b penetrates through the cam groove 13b of the zoom cam ring 13.

The zoom cam ring 13 is a member, rotating together with the zoom ring 15, for giving a driving force for moving the third and fourth lens group moving frames 3, 4 in the direction of the optical axis I. The zoom cam ring 13 is, as illustrated in FIG. 2, formed with a curvilinear cam groove 13a through which the zoom pin 12a movably penetrates, and a rectilinear cam groove 13b, inclined to the optical axis I, through which the zoom pin 12b movable penetrates. Outer peripheral portions of the third and fourth lens group moving frames 3, 4 are, as shown in FIG. 1, so fitted to the inner peripheral portion of the zoom cam ring 13 as to be movable in the direction of the optical axis I. Secured to the outer peripheral portion of the zoom cam ring 13 is a zoom pin 14 protruding from a end portion formed with the cam groove 13b and penetrating through this cam groove 13b and peripheral grooves 2e, 15b, wherein the tip of the zoom pin 14 is fitted into a hole 15a of the zoom ring 15. Further, the outer peripheral portion of the zoom ring 13 is so fitted to the inner peripheral portion of the intermediate-diameter portion 2b of the fixed drum 2 as to be rotatable about the optical axis I.

An operation of the lens barrel in accordance with the embodiment of the present invention will be explained with a classification into a focusing operation and a zooming operation.

Focusing Operation

A photographer rotates the focusing ring 19 when in manual focusing, and thereupon the cam ring 6 rotates about the optical axis I together with the focus ring 19. One end of the focus ring 19 is held by the large-diameter portion 2c of the fixed drum 2, and the substantially central portion thereof is held by the holding ring 18 as well as by the fixing member 17. As a result, the focusing ring 19 rotates without being inclined to the optical axis I. When in autofocusing, the segment gear 6d of the cam ring 6 receives the driving force from a camera body side via an unillustrated power transmission mechanism meshing with this segment gear 6d, whereby the cam ring 6 rotates about the optical axis I.

One end of the cam ring 6 is held by the first holding portion to the intermediate-diameter portion 2b of the fixed drum 2, and the front end portion of the cam ring 6 is held by the second holding portion to the fixing member 17 and the holding ring 18. As a result, even if the first holding portion and the second holding portion are spaced away from each other in the direction of the optical axis I, the cam ring 6 rotates without being inclined to the optical axis I owing to the holding 18 and the fixing member 17 which protrudes from the front end portion 2a of the fixed drum 2 and penetrates through the clearance groove 1d of the first lens group moving frame 1. When the cam ring 6 rotates, a side surface of the cam groove 6a formed in the cam ring 6 pushes, in the direction of the optical axis I, the focus pin 5 movably fitted into the cam groove 6a. The rectilinear advance pin 7 fixed to the front end portion 2a of the fixed drum 2 is fitted into the rectilinear advance guide groove 1c formed in the intermediate-diameter portion 1a of the first lens group moving frame 1 fitted with the focus pin 5. Therefore, the first lens group moving frame 1 rectilinearly moves in the direction of the optical axis I without rotating about the optical axis I, and focusing is carried out by the focusing lens groups L1, L2, L3.

Zooming Operation

When the photographer rotates the zoom ring 15, the zoom pin 14, the tip of which is fitted into the hole 15a of the zoom ring 15, causes the zoom cam ring 13 fitted with this zoom pin 14 to rotate together with the zoom ring 15. The zoom pin 14 is fitted into the peripheral grooves 2e, 15b formed in the circumferential direction of the intermediate-diameter portion 2b and the large-diameter portion 2c of the fixed drum 2, and hence the zoom cam ring 13 rotates about the optical axis I without moving in the direction of the optical axis I.

The zoom pin 12a secured to the third lens group moving frame 3 and the zoom pin 12b secured to the fourth lens group moving frame 4, respectively penetrate through the cam grooves 13a, 13b formed in the zoom cam ring 13. Then, the tips of the zoom pins 12a, 12b are fitted into the guide groove 2d formed in the intermediate-diameter portion 2b of the fixed drum 2. Therefore, when the zoom cam ring 13 rotates, the zoom pins 12a, 12b are pushed in the direction of the optical axis I by the side surfaces of the cam grooves 13a, 13b, and thus guided in the direction of the optical axis I along the guide groove 2d. In consequence of this, the third and fourth lens group moving frames 3, 4 move with a predetermined quantity in the direction of the optical axis I without rotating about the optical axis I, thus performing the zooming operation.

With the zooming operation, the third lens group moving frame 3 moves in the right direction in the Figure, whereas the fourth lens group moving frame 4 moves in the left direction in the Figure, at which time a space between the third lens group moving frame 3 and the fourth lens group moving frame 4 is compressed. The thus compressed air flows through the air flow path 20c and the air flow groove 20d that are formed in the lens mounting member 20 of the third lens group moving frame 3, and is discharged into the space defined by the fixed lens groups L4, L5, the fixing frame 2g and the third lens group moving frame 3.

The lens barrel in the embodiment of the present invention is a lens barrel having the large maximum photographing magnification and therefore capable of carrying out, e.g., the close-up photography, and has large moving quantities of the focusing lens groups L1, L2, L3 that are required for focusing up to the closest focusing distance. In accordance with the embodiment of the present invention, in order to reduce a length of the lens barrel in the direction of the optical axis I in the embodiment of the present invention, it is required that the intermediate-diameter portion 1a of the first lens group moving frame 1 be intruded, with respect to the radial direction, between the intermediate-diameter portion 2b of the fixed drum 2 and the cam ring 6 up to the vicinity of the first holding position of the cam ring 6. Hence, when making an attempt to support the cam ring 6 in only the first holding position, the cam ring 6 gets inclined to the optical axis I, and there might be a possibility in which this cam ring 6 is unable to surely rotate. Further, the focusing ring 19 rotating together with this cam ring 6 also has a possibility of its being inclined to the optical axis I simply by supporting one end thereof on the large-diameter portion of the fixed drum 2. In accordance with the embodiment of the present invention, the second holding position can be set apart from the first holding position, and the contact portion having the sufficient length can be formed between the cam ring 6 fitted to the outer peripheral portion of the fixed drum 2 in the direction of the optical axis I and the intermediate-diameter portion 2b of the fixed drum 2. Therefore, the cam ring 6 and the focus ring 19 can be rotatably supported by the fixing member 17 penetrating through the clearance groove 1d of the first lens group moving frame 1, and the holding ring 18.

The lens barrel in the embodiment of the present invention is provided with four pieces of the fixing members 17 in the circumferential direction of the front end portion 2a so as to protrude from the outer peripheral portion of the front end portion 2a of the fixed drum 2, and the holding ring 18 is attached to the support portions 17a of the fixing members 17. Hence, the cam ring 6 and the focus ring 19 can be held by the holding ring 18 with an extremely high accuracy and stability, and these members can be smoothly rotated. Further, the movement of the focus ring 19 in the direction of the optical axis I can be surely regulated by the protruded portions 17b of the fixing members 17.

Moreover, the clearance groove 1d of the first lens group moving frame 1 is formed to the length enough to allow the penetration of the fixing member 17 when the first lens group moving frame 1 moves in the direction of the optical axis I. Therefore, this clearance groove 1d is not necessarily formed along the whole periphery of the intermediate-diameter portion 1a of the first lens group moving frame 1. It may suffice that the through-hole is formed so as to notch some portion thereof, and a sufficient strength of the first lens group moving frame 1 can be secured.

In the lens barrel in the embodiment of the present invention, the lens mounting member 20 of the third lens group moving frame 3 is formed with the air flow path 20c and the air flow groove 20d, and hence it is feasible to communicate the air in the front-side space in the moving direction of the third lens group moving frame 3 and the air on the rear-side space in the moving direction. Further, the radial surface portion 20d protruding in the direction substantially perpendicular to the optical axis I, is formed with the air flow groove 20d on the side opposite to the light beam incident side (on the side of the object), and it is therefore possible to certainly intercept the light beams from entering the air flow path 20d.

Other Embodiments

The present invention is not limited to the embodiment discussed above and may be modified and changed in a variety of forms according to the technical concept of the present invention, and these modifications and changes fall within the equal range of the present invention.

For example, in the above-explained embodiment the totally four fixing members 17 are provided at the front end portion 2a of the fixed drum 2. The number of fixing members 17 to be provided is not, however, particularly limited. Further, the holding ring 18 may be omitted, and the cam ring 6 and the focus ring 19 may be supported directly on the fixing members 17. In this case, the cam ring 6 and the focus ring 19 can be smoothly rotated on the outer peripheral portions of the fixing members 17 by selecting a highly slidable material of the fixing member 17 or by smoothly working the outer peripheral portions of the fixing members 17. Note that the cam ring 6 used for the focusing operation has been described in the embodiments of the present invention, but the present invention can be applied to a lens barrel having a structure in which the zooming operation is executed by the cam ring.

What is claimed is:

1. A lens barrel comprising:
   a movable frame for holding an optical system;
   a fixed drum for supporting said movable frame so as to be movable in the direction of an optical axis; and
   a cam drum for moving said movable frame;
   wherein said movable frame is movably disposed between said fixed drum and said cam drum; and
   an outer peripheral portion of said fixed drum is provided with a support portion, penetrating through said movable frame, for rotatably supporting said cam drum.

2. The lens barrel according to claim 1, wherein said movable frame is formed with a plurality of through-holes in the direction of the optical axis, and
   said support portion has:
   a plurality of protruded members protruding from the outer peripheral portion of said fixed drum and penetrating said through-holes; and
   a support ring, provided on said protruded members, for slidably supporting an inner peripheral portion of said cam drum.

3. The lens barrel according to claim 1, wherein said support portion is an inclination regulating portion for preventing said cam drum from being inclined to the optical axis.

4. A lens barrel comprising:
   a movable frame for holding an optical system;
   a fixed drum for movably supporting said movable frame in the direction of an optical axis;

a cam drum for moving said movable frame; and an operation ring for giving an operational force to said cam drum by its rotation;

wherein one end of said operation ring is rotatably supported on an outside fixed drum provided outwardly of said fixed drum; and an outer peripheral portion of said fixed drum is provided with a support portion, penetrating said movable frame, for rotatably supporting said operation ring.

5. The lens barrel according to claim 4, wherein said movable frame is formed with a plurality of through-holes in the direction of the optical axis, and said support portion has a plurality of protruded members protruding from the outer peripheral portion of said fixed drum and penetrating said through-holes, and a support ring, provided on said protruded members, for slidably supporting an inner peripheral portion of said cam drum and/or said operation ring.

6. The lens barrel according to claim 4, wherein said support portion is an inclination regulating portion for preventing said cam drum and/or said operation ring from being inclined to the optical axis.

7. A lens barrel comprising:

a fixed lens group;

a focusing lens group movable in an optical-axis direction;

a fixed drum, for fixedly holding said fixed lens group, integrally having a large-diameter portion opened toward a front end side of said lens barrel and an intermediate-diameter portion a diameter of which is smaller than that of said large-diameter portion, both of said large-diameter portion and said intermediate-diameter portion extending in the direction of the optical axis, said fixed drum being formed with an annular space opened toward a front end between said large-diameter portion and said intermediate-diameter portion;

a movable support frame integrally having a first portion taking a cylindrical shape and extending from the front end side of said lens barrel into said annular space of said fixed drum, and a second portion for supporting said focusing lens group;

a cam drum, rotatably supported on the side of an outer periphery of said intermediate-diameter portion of said fixed drum on the side of a rear end and extending between said large-diameter portion and said first portion of said movable support frame within said annular space, for moving said movable support frame in the direction of the optical axis with rotations;

a support member, provided on an outer periphery of said intermediate-diameter portion of said fixed drum, penetrating a hole so formed in said movable support frame as to extending in the direction of the optical axis and extending in a radial direction, for rotatably supporting said cam drum;

regulating means, provided on said rotational drum, for hindering a rotation of said movable support frame and permitting a movement thereof in the direction of the optical axis; and cam means for converting the rotation of said cam drum into a motion of said movable support frame in the direction of the optical axis and transmitting this motion.

8. The lens barrel according to claim 7, wherein said cam means is constructed of a spiral groove formed in an inner peripheral surface of said cam drum, and a pin member protruded outward in the radial direction from said first portion of said movable support frame and engaging with said spiral groove.

9. The lens barrel according to claim 7, wherein said regulating means is constructed of a groove so formed in said intermediate-diameter portion of said fixed drum as to extend in the direction of the optical axis, and a protruded member protruding from said first portion of said movable support frame and engaging with said groove.

10. The lens barrel according to claim 7, wherein an external operation ring is rotatably provided at a front end of said large-diameter portion of said fixed drum as well as on the outer periphery of said movable support frame so that the rotation is transmitted to said cam drum.

11. The lens barrel according to claim 7, wherein said cam drum is able to engage with a rotation driving portion on the side of a camera.

* * * * *